US007977643B2

(12) United States Patent
Weinberg

(10) Patent No.: US 7,977,643 B2
(45) Date of Patent: Jul. 12, 2011

(54) RADIATION DETECTOR ASSEMBLY, RADIATION DETECTOR, AND METHOD FOR RADIATION DETECTION

(76) Inventor: Irving Weinberg, Bethesda, MD (US)

( * ) Notice: Subject to any disclaimer, the term of this patent is extended or adjusted under 35 U.S.C. 154(b) by 604 days.

(21) Appl. No.: 12/123,412

(22) Filed: May 19, 2008

(65) Prior Publication Data

US 2009/0179155 A1 Jul. 16, 2009

Related U.S. Application Data

(60) Provisional application No. 61/010,929, filed on Jan. 14, 2008.

(51) Int. Cl.
*G01T 1/24* (2006.01)

(52) U.S. Cl. .................................................. 250/370.01

(58) Field of Classification Search ............. 250/370.01, 250/370.1, 370.14, 370.12; 257/E33.008; 313/503
See application file for complete search history.

(56) References Cited

U.S. PATENT DOCUMENTS

| | | | | |
|---|---|---|---|---|
| 5,306,943 | A * | 4/1994 | Ariyoshi et al. | 257/457 |
| 6,169,287 | B1 * | 1/2001 | Warburton | 250/370.1 |
| 6,259,099 | B1 | 7/2001 | Foulon et al. | |
| 6,501,089 | B1 * | 12/2002 | Kuwabara | 250/591 |
| 6,734,431 | B1 | 5/2004 | Glasser | |
| 7,196,333 | B1 | 3/2007 | Gerstenmayer et al. | |
| 7,203,279 | B2 | 4/2007 | Fujii et al. | |
| 2004/0245497 | A1 * | 12/2004 | Hanna et al. | 252/299.01 |
| 2007/0100026 | A1 | 5/2007 | Munro et al. | |
| 2008/0122341 | A1 * | 5/2008 | Orita et al. | 313/503 |

OTHER PUBLICATIONS

A Watt, T Eichman, H Rubinsztein-Dunlop, P Meredith. "Carrier Transport in PbS Nanocrystal Conducting Polymer Composites". Appl. Phys. Lett. 87, 253109 (2005).

D.V Talapin, AL Rogach, A Kornowski, M Haase, H Weller. "Highly Luminescent Monodisperse CdSe and CdSe/ZnS Nanocrystals Synthesized in a Hexadecylamine-Trioctylphosphine Oxide-Trioctylphosphine Mixture". Nano Lett. 1:207-211 (2001).

A.J. Frank et al. "Does Network Geometry Influence the Electron transport Dynamics in Mesoporous Nanoparticle Solar Cell?" Presented at Nat. Cent. For Photovolt. And Sol. Prog. Rev. Meeting, Denver, Colorado, Mar. 24-26, 2003.

K.D. Benkstein et al. "Influence of the Network Geometry on Electron Transport in Nanoparticle Networks". Proceedings of 2003 MRS Fall Meeting, Symposium N (vol. 789).

GG Wallace. "Conjugated polymers: New materials for photovoltaics". Chemical Innovation 30(1):14-22 (2000).

W. U. Huynh, X. G. Peng, and A. P. Alivisatos. "CdSe Nanocrystal Rods/poly(3-hexylthiophene) Composite Photovoltaic Devices". Adv. Func. Mat., 11, 923, (1999).

(Continued)

*Primary Examiner* — David P Porta
*Assistant Examiner* — Faye Boosalis
(74) *Attorney, Agent, or Firm* — Barnes & Thornburg LLP

(57) ABSTRACT

An assembly for detecting radiation is described. The assembly includes a host matrix with particles suspended within the host matrix. The particles are capable of generating a charge carrier upon interaction with the radiation. A first electrode is disposed adjacent to a first surface of the host matrix, and a second electrode disposed adjacent to a second surface of the host matrix. A power source operatively connects to one of the first or second electrodes. The power source establishes an electric field between the first and second electrodes such that a ratio of a mobility-lifetime-field strength product of the charge carrier to the thickness of the host matrix is greater than or equal to 0.1. A radiation detector and a method for detecting radiation are also described.

60 Claims, 9 Drawing Sheets

OTHER PUBLICATIONS

JL Mohanan, IU Arachchige, SL Brock. "Porous Semiconductor Chalcogenide Aerogels". Science 307 (5708): 397-400 (2005).
AP Jeavons et al. "A 3D HIDAC-PET Camera with Sub-millimetre. Resolution for Imaging Small Animals". IEEE Trans on Nucl. Sci. 46. 468-478 (1999).
U Fano. "Ionization yield of radiations. II. The fluctuations of the number of ions". Phys. Rev., 72:26-29 (1947).
A Owens. "Semiconductor materials and radiation detectors. Journal of Synchrotron Radiation". 13:143-150 (2006).
S Letant and TF Wang. "Study of porous glass doped with quantum dots or laser dyes under alpha irradiation". Applied Physics Letters 88:103110-103113 (2006).
IH Campbell and BK Crone. "Quantum-Dot/Organic Semiconductor Composites for Radiation Detection". Adv. Mater. 1 (8):77-79 (2006).
JL Gerstenmayer. "High DQE performance X- and gamma-ray fast imagers: Emergent concepts". Nucl. Instr. And Methods in Physics Research A 422:649-655 (1999).
16. A Watt, E Thomsen, P Meredith, H Rubinsztein-Dunlop. "A new approach to the synthesis of conjugated polymer-nanocrystal composites for heterojunction optoelectronics". Chem. Commun. 2334-2335 (2004).
Notification of Transmittal of the International Search Report and The Written Opinion of the International Search Authority or the Declaration, for PCT/US09/030309, filed Jan. 7, 2009.

* cited by examiner

RADIATION DETECTOR ASSEMBLY, RADIATION DETECTOR, AND METHOD FOR RADIATION DETECTION

CROSS-REFERENCE TO RELATED APPLICATIONS

This application relies for priority on U.S. Provisional Patent Application Ser. No. 61/010,929, filed on Jan. 14, 2008, the contents of which are incorporated herein by reference.

GOVERNMENT LICENSE RIGHTS

The U.S. Government has a paid-up license in this invention and the right in limited circumstances to require the patent owner to license others on reasonable terms as provided for by the terms of Contract No. 2R42HL086294 awarded by the "National Lung and Blood Institute".

FIELD OF INVENTION

This disclosure concerns an apparatus and a method for radiation detection. More specifically, this disclosure describes a semiconductor type composite material useable for radiation detection and a method of use of that material.

DISCUSSION OF RELATED ART

As should be apparent to those skilled in the art, ionizing radiation interacts with matter in several ways. Among the different ways in which ionizing radiation interacts with matter, there are three of particular note: (1) Compton scattering, (2) photo-electric absorption, and (3) pair production. In the case of Compton scattering, ionizing radiation is converted into a charged and a neutral particle. For example, an impingent gamma photon may be converted into an electron and a lower energy gamma photon. In the case of photo-electric absorption, a high-energy gamma photon may be converted into one or more charged particles. For example, the gamma photon may be absorbed, thereby liberating one or more electrons. In the case of pair production, a high-energy gamma photon may be converted into an electron-positron pair.

As also should be understood by those skilled in the art, a gamma-ray or an x-ray resulting from initial radiation absorption is termed secondary radiation. Secondary radiation may then interact with matter and undergo one of the same three processes (i.e., Compton scattering, photo-electric absorption or pair production). Alternatively, the secondary radiation may escape the detector material without any further interaction.

Charged particles resulting from the initial or secondary radiation absorption event (e.g., electrons, positrons, etc.) lose their energy while traveling through matter by ionizing and otherwise exciting atoms and molecules within the matter. The ionization products may be energetic enough to ionize and/or excite matter further. The process of radiation interaction continues until all particles are thermalized so that they no longer have enough energy to produce more ionization and/or excitation effects. A similar ionization process occurs for deposition of energy in matter by radiation in the form of non-charged particles, e.g., neutron irradiation.

Radiation detectors may be classified as either scintillators or direct-detection devices.

In general, scintillating radiation detectors do not have voltage applied to them. Because there is no electric field applied to the scintillating material, negatively and positively charged particles produced in the scintillator by the incident radiation recombine due to electric forces attracting them to each other. This recombination occurs with a time-dependent decay pattern. Often, the recombination results in excited atom or molecules, which also decay. In scintillators, recombination and/or excitation decay results in emission of photons, generally in the visible portion of the electromagnetic spectrum. If a scintillator is transparent to the light emitted as a result of radiation absorption, the emitted light that escapes the scintillator may be detected. For example, a scintillator may be affixed to a photomultiplier tube, which converts emitted light into an electric signal. The emitted light may provide information about the incident ionizing radiation (e.g., flux, timing, energy).

Direct-detection devices operate by collecting the ionization products (i.e., charge carriers) produced by the incident radiation. Positively and negatively charged carriers (i.e., electrons and holes) drift when an electric field is applied to the direct-detection solid-state device. The motion of these electric charges may be converted into electric signal. This electrical signal may be measured by direct collection of some or all of the charged particles. Alternatively, the electrical signal may measure some or all induced charges at electrodes that are affixed to (or are part of) the direct-detection device.

Whether the device is a scintillation detector or a direct-detection device, the signal collected from a radiation detector is related to the energy of the incident radiation. For a scintillator, the total charge may be measured by integrating the current delivered by the photomultiplier that converted the scintillator light into an electrical signal. For direct-detection devices, charge may be collected directly at the electrodes affixed to (or part of) the devices.

The ability to accurately characterize the energy associated with the incident radiation is useful in many applications of radiation detection. In medical imaging, for example, accurate energy characterization may be used to improve image quality, by reducing the effect of radiation scatter that occurs in the human body. Since radionuclides create gamma rays with specific energy (e.g., 140 keV emitted by technetium-99m), gamma-rays with energies that deviate from this energy may be ascribed to scattering events in the body. The accuracy of energy measurement is quantitatively expressed as energy resolution, which is generally defined as the ratio of the measured width of the energy peak for a standard radioisotope (e.g., the 661 keV peak of cesium-137) to the measured mean energy in that peak. In general, the energy resolution obtainable with direct-detection devices is better than with scintillators.

For both the scintillating and direct-detection devices, the efficiency of radiation detection is a function of the average atomic number (Z) of the material constituting the scintillator and direct-detection solid-state device. Detecting lower energy gammas (e.g., with photon energy below 200 keV) is efficient even with relatively low Z materials (e.g., plastic, silicon). Efficient detection of higher energy gammas (e.g., with energy above 300 keV) with low Z materials requires detectors of large size, which is an unattractive property for size-sensitive applications. High-Z materials have the advantage of compact size, but the electrical properties of high-Z materials are often suboptimal for scintillators. As an example, lead-glass (a scintillator) has a very low light output, which impedes a photomultiplier's ability to convert the light emitted by lead-glass into electrical signals.

The electrical properties of high-Z materials are often suboptimal for direct-detection devices. As an example, the charge-carriers in the solid-state semiconductor lead sulfide cannot travel long distances before recombining or being trapped. As a result, only thin detectors may be made of lead sulfide. Quantitatively, this unfavorable property of lead sulfide is denoted as a low mobility-lifetime product. As a result of the low mobility-lifetime product, direct-detection solid-state devices made of lead sulfide are not easily fabricated in configurations that efficiently detect high energy gamma rays.

Direct-detection devices may be fabricated from combinations of different materials. This type of design is described as a "sandwich" detector. The sandwich detector is constructed of alternating layers of two or more materials, each of which has a different atomic number. A classic sandwich detector employs alternating planar layers of high-Z and low-Z materials. The planar high-Z layer converts high-energy gamma-rays into secondary charged particles (e.g., electrons). The adjacent planar low-Z layer converts the secondary charged particles into other charge carriers that are then collected by electrodes.

One problem with sandwich detectors is that it is extraordinarily difficult to determine how many of the secondary charged particles created within the high-Z layer escaped that layer and entered the low-Z layer. As a result, these sandwich detectors have poor accuracy in characterizing the energy of the gamma-ray that was originally incident on the planar high-Z layer. This inaccuracy leads to poor energy resolution in many instances.

One type of sandwich detector is described by J. L. Gerstenmayer in U.S. Pat. No. 7,196,333. Gerstenmayer teaches the use of a planar section of bulk high-Z material (e.g., lead), which Gerstenmayer denotes in the claims as "a sheet of the first material." The sheet of the first material is positioned adjacent to a planar layer of composite material. The layer of composite material is comprised of a mixture of guest particles and a host matrix made from a polymer. The guest particles may be coated to prevent agglomeration. The sheet of the first material converts gamma rays into secondary electrons. The secondary electrons are then converted by the composite layer into charge carriers, which are collected by electrodes.

Gerstenmayer, in the course of describing his invention, discloses the general idea of a radiation detector consisting of a composite material, including guest particles and a host matrix, which is placed between two electrodes, and which is exposed to an electric field.

Those skilled in the art should appreciate that composite materials including guest particles disposed in a polymer matrix may have electronic properties that differ from bulk preparations of the material making up the guest particles. For example, Watt teaches that a mixture of lead-sulfide guest particles disposed in organic polymers have longer mobility-lifetimes than bulk lead-sulfides. (A Watt, T Eichman, H Rubinsztein-Dunlop, P Meredith. Carrier Transport in PbS Nanocrystal Conducting Polymer Composites. Appl. Phys. Lett. 87, 253109 (2005).) Watt teaches that such a mixture may be constructed, with appropriate charge-collecting structures (e.g., anode, cathode) into a device whose purpose is to convert visible light into electricity (i.e., a photovoltaic power cell).

It is known that the application of coatings to small particles (e.g., nanoparticles) may change the electrical behavior of those particles. Talapin, for example, teaches how particle surface passivation with a wide band-gap inorganic shell or with an alkylamine organic shell may improve the quantum efficiency of these particles. (D. V Talapin, A L Rogach, A Kornowski, M Haase, H Weller. Highly Luminescent Monodisperse CdSe and CdSe/ZnS Nanocrystals Synthesized in a Hexadecylamine-Trioctylphosphine Oxide-Trioctylphosphine Mixture. Nano Lett. 1:207-211 (2001).)

It is known that nanoparticles may be assembled into networks for transport of charge in photovoltaics. Frank and Benkstein, for example, describe the use of such networks for photovoltaic cells. (A. J. Frank et al, Does Network Geometry Influence the Electron transport Dynamics in Mesoporous Nanoparticle Solar Cell? Presented at Nat. Cent. For Photovolt. And Sol. Prog. Rev. Meeting, Denver, Colo., Mar. 24-26, 2003; K. D. Benkstein et al, Influence of the Network Geometry on Electron Transport in Nanoparticle Networks, Proceedings of 2003 MRS Fall Meeting, Symposium N (Volume 789).)

It is known that heterojunctions may have a beneficial effect on excitons separation and therefore improve charge transport. Wallace, for example, teaches how to increase the number of heterojunctions in a polymer and that increased number of heterojunctions results in improved excitons separation. (G G Wallace "Conjugated polymers: New materials for photovoltaics". Chemical Innovation 30(1):14-22 (2000) .)

It is known that the shape of nanocrystals may have a beneficial effect on charge transport. Huynh, for example, describes that hybrid nanorod-polymer composite with nanorods partly oriented in the direction of electron transport may have significantly improved charge transport because of band conduction dominating over the hopping. (W. U. Huynh, X. G. Peng, and A. P. Alivisatos, "CdSe Nanocrystal Rods/poly (3-hexylthiophene) Composite Photovoltaic Devices," Adv. Func. Mat., 11, 923, (1999).)

Despite these teachings in the prior art, which were primarily in the field of photovoltaics, there remains a need for improved radiation detection and detectors.

SUMMARY OF THE INVENTION

It is, therefore, one aspect of the invention to provide a radiation detector that provides improved detection capabilities.

The invention involves, among other features, aspects of a direct-detection device. The direct-detection device includes one or more composite layers. Each composite layer includes a host matrix of a semiconducting material (e.g., a polymer) and guest particles (e.g., lead sulfide quantum dots or other nanoparticles) dispersed within the host matrix.

The invention also includes features for creating an electric field in the one or more composite layers. These structures may include, without limitation: anodes, cathodes, focusing electrodes or field-shaping electrodes. Ionization products in the composite layer that are created as a result of incident radiation are collected (directly or via induced charge) via the features for creating electric fields, or via additional structures or means. These additional structures or means may include one or more collecting electrodes.

When used with high atomic number quantum dots, and with charge carrier transport characteristics enabling thick detectors, the invention is expected to exhibit high efficiency for detecting high-energy gamma radiation. This high efficiency may be put to good use in constructing devices for medical imaging (e.g., x-ray computed tomography or positron emission tomography scanners) or for portal monitoring (e.g., to detect illicit radioactive materials) as part of a security screening checkpoint, for example.

In one variation, the invention provides an assembly for detecting radiation that includes a host matrix defining a first surface and a second surface and a thickness between the first and second surfaces, a plurality of particles suspended within the host matrix, the plurality of particles being capable of generating at least one charge carrier upon interaction with the radiation, a first electrode disposed adjacent to the first surface of the host matrix, a second electrode disposed adjacent to the second surface of the host matrix, and a power source, operatively connected to at least one of the first and second electrodes. In this variation, the power source is configured to establish an electric field between the first and second electrodes. A mobility-lifetime-field strength product for the at least one charge carrier is defined by the equation MLFP=E·t·M, where MFLP is a value for the mobililty-lifetime-field strength product, where E is a value for the electric field between the first and second electrodes, where t is a value for the lifetime of the at least one charge carrier, where M is a value for the mobility of the at least one charge carrier, and where a ratio of the mobility-lifetime-field strength product to the thickness between the first and second surfaces of the host matrix is greater than or equal to 0.1.

In another variation, the invention provides for a radiation detector that includes a plurality of assemblies for detecting radiation, disposed adjacent to one another in a stacked fashion. Each of the assemblies include a host matrix defining a first surface and a second surface and a thickness between the first and second surfaces, a plurality of particles suspended within the host matrix, the plurality of particles being capable of generating at least one charge carrier upon interaction with the radiation, a first electrode disposed adjacent to the first surface of the host matrix, a second electrode disposed adjacent to the second surface of the host matrix, and a power source, operatively connected to the first and second electrodes. The power source is configured to establish an electric field between the first and second electrodes, wherein a mobility-lifetime-field strength product for the at least one charge carrier is defined by the equation MLFP=E·t·M, wherein MFLP is a value for the mobililty-lifetime-field strength product, wherein E is a value for the electric field between the first and second electrodes, wherein t is a value for the lifetime of the at least one charge carrier, wherein M is a value for the mobility of the at least one charge carrier, wherein a ratio of the mobility-lifetime-field strength product to the thickness between the first and second surfaces of the host matrix is greater or equal to 0.1, and wherein at least one of the first and second electrodes generates an electrical signal associated with at least one of the charge carriers. A processor for receiving and processing the electrical signal is also included. At least one amplifier is disposed between at least one of the first or second electrodes and the processor to amplify the electrical signal before the electrical signal is provided to the processor.

The invention also provides for a method for detecting radiation in an assembly for detecting radiation comprising a host matrix defining a first surface and a second surface and a thickness between the first and second surfaces, a plurality of particles suspended within the host matrix, the plurality of particles being capable of generating at least one charge carrier upon interaction with the radiation, a first electrode disposed adjacent to the first surface of the host matrix, a second electrode disposed adjacent to the second surface of the host matrix, a power source, operatively connected to the first and second electrodes, and a processor connected to at least one of the first and second electrodes, wherein the power source is configured to establish an electric field between the first and second electrodes, wherein a mobility-lifetime-field strength product for the at least one charge carrier is defined by the equation MLFP=E·t·M, wherein MFLP is a value for the mobililty-lifetime-field strength product, wherein E is a value for the electric field between the first and second electrodes, wherein t is a value for the lifetime of the at least one charge carrier, wherein M is a value for the mobility of the at least one charge carrier, and wherein a ratio of the mobility-lifetime-field strength product to the thickness between the first and second surfaces of the host matrix is greater or equal to 0.1, the method includes establishing the electrical field between the first and second electrodes, generating the charge carrier as a result of interaction between the radiation and at least one of the plurality of particles, capturing the charge carrier by at least one of the first and second electrodes, generating an electrical signal as a result of capturing the charge carrier by the at least one of the first and second electrodes, providing the electrical signal to the processor, and processing the electrical signal to establish characteristics associated with the radiation.

Other features of the invention will be made apparent from the discussion that follows.

BRIEF DESCRIPTION OF THE DRAWINGS

Aspects and features of the invention are described in connection with various figures, in which.

DESCRIPTION OF EMBODIMENT(S) OF THE INVENTION

While specific embodiments of the radiation detector of the invention are described below, the discussion is not intended to be limiting of the invention. To the contrary, the description of specific embodiments is intended to illustrate the broad scope of the invention. As a result, any discussion of particular embodiments is intended to be exemplary only. It is understood that those skilled in the art may appreciate variations and equivalents of the embodiments described herein. Those variations and equivalents are intended to be encompassed by the scope of the invention.

Figure 1:
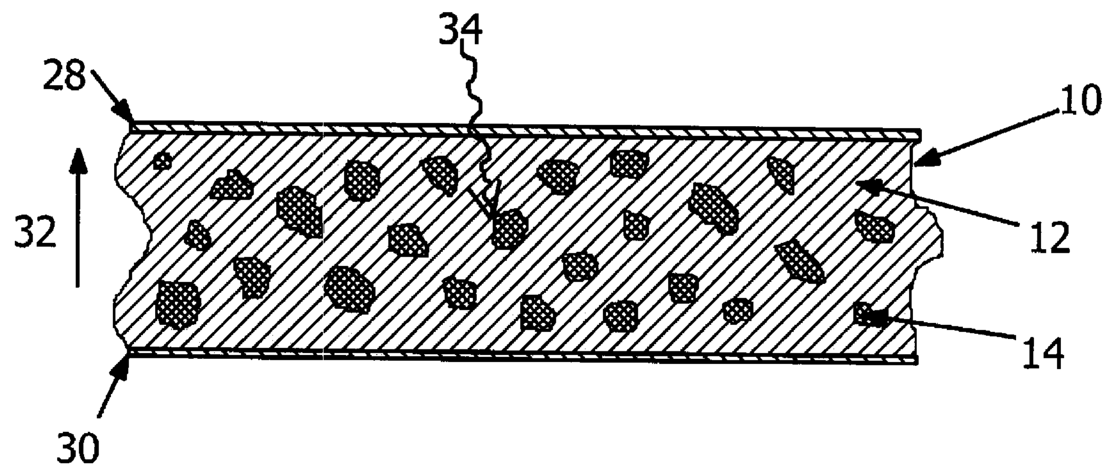
FIG. 1 is an illustration, showing a partial cross-section of a first embodiment of one layer of a radiation detector constructed according to the invention.

FIG. 1 provides a partial cross-sectional side view of one composite layer 10 contemplated for use within the radiation detector of the invention. The composite layer 10 includes a composite material consisting of a host matrix 12 of a semiconducting polymer (such as plastic), in which nanoparticles 14 are embedded.

A nanoparticle 14 is defined, inter alia, as a sufficiently small quantity of a material where the electrical properties of the nanoparticle 14 differ from the electrical properties of a bulk quantity of the same material as a result of quantum confinement effects. It is contemplated that a nanoparticle 14 will contain at least ten atoms. The nanoparticle 14 may be made up of a single element, a combination of elements (e.g., compounds), or a combination of macroscopic ingredients, among other compositions. As should be appreciated by those skilled in the art, the exact material that makes up the nanoparticles 14 is not critical to the invention. The invention, therefore, is intended to encompass a broad variety of different materials and their equivalents.

As a general rule, the shape and orientation of the nanoparticles 14 also are not critical to the invention. However, as will be discussed in greater detail below, it is anticipated that nanoparticle 14 may be shaped such that orientation does affect device performance. In these instances, one or both of shape and orientation may be controlled to optimize device performance.

In one embodiment, the nanoparticles 14 are spherical quantum dots. In other contemplated embodiments, the nanoparticles 14 are amorphous blobs. In still further embodiments, the nanoparticles are rod-shaped, cube-shaped, rectangularly shaped, pyramidally shaped. It is contemplated that, depending upon the material forming the nanoparticles 14, any suitable geometric or non-geometric shape may be employed without departing from the scope of the invention.

The states of the host matrix or nanoparticles are not critical to the invention. They may be solid, liquid, gel, plasmas, or gases.

In one contemplated embodiment, the nanoparticles 14 are spherically shaped and are made up of lead-containing compounds. The nanoparticles 14 may be uncoated particles suspended in the host matrix 12.

Figure 2:
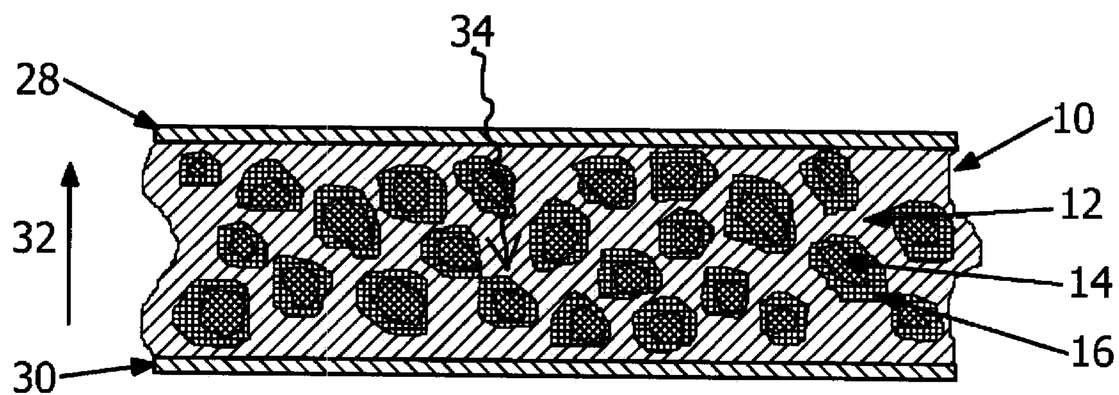
FIG. 2 is a partial cross-section of a second embodiment of one layer of a radiation detector constructed according to the invention.

Alternatively, as illustrated in FIG. 2, the nanoparticles 14 may be enveloped in one or more outer coatings 16. The outer coating 16 may fully encapsulate each nanoparticle 14. Alternatively, the outer coating 16 may only partially encapsulate each nanoparticle 14. Whether the nanoparticle 14 is fully or partially encapsulated by the outer coating 16 depends on the particular materials employed.

Figure 3:
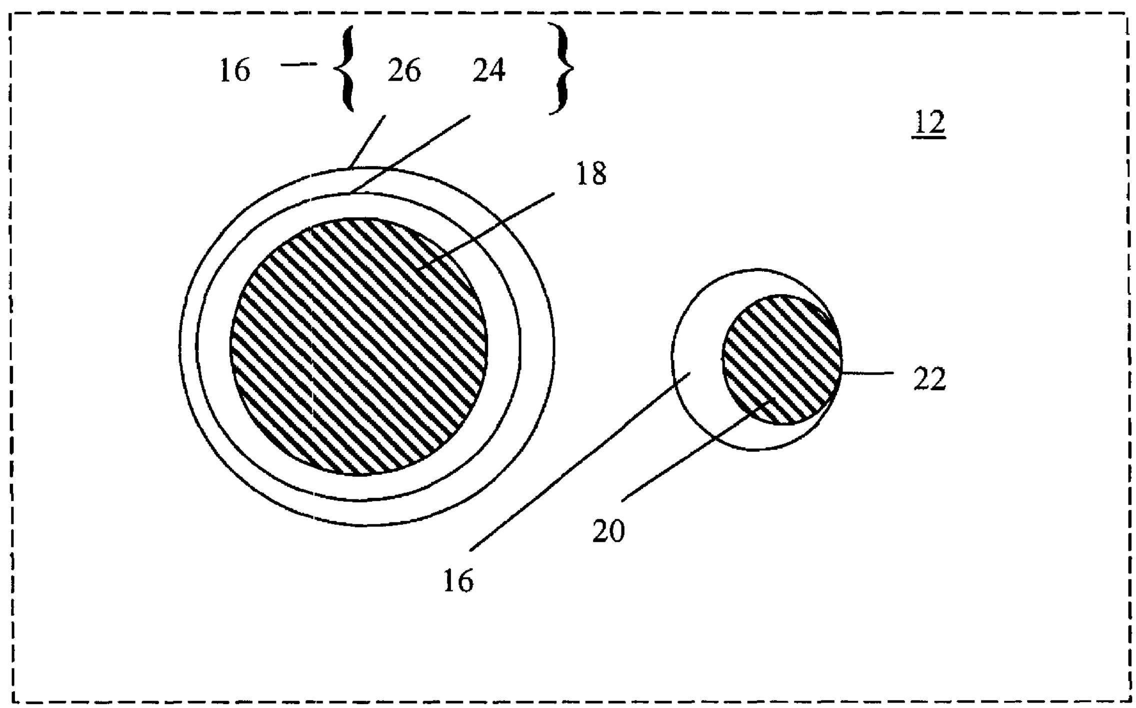
FIG. 3 is an enlarged, cross-sectional side view of one layer of a radiation detector constructed according to the invention, showing aspects of the nanoparticles suspended in a host matrix.

FIG. 3 is an enlarged detail of two nanoparticles 14 suspended in the host matrix 12. For ease of reference, the larger nanoparticle 14 is referred to as nanoparticle 18, and the smaller nanoparticle 14 is referred to as nanoparticle 20. For simplicity, both nanoparticles 18, 20 are shown as spherical particles.

As also shown in FIG. 3, the smaller nanoparticle 20 may be coated with a single layer outer coating 16. The single layer outer coating 16 is not evenly distributed on the exterior surface of the nanoparticle 20. In this illustration, the outer coating 16 is distributed such that a portion of the exterior surface 22 of the nanoparticle 20 is exposed. Alternatively, the outer coating 16 may fully encapsulate the nanoparticle 20.

The larger nanoparticle 18 may be coated with an outer coating 16. As shown in FIG. 3, the outer coating 16 includes an inner coating layer 24 and an outer coating layer 26. As should be appreciated by those skilled in the art, a greater number of layers may be employed without departing from the scope of this disclosure.

With continued reference to FIG. 1, the host matrix 12 may be a semiconductor plastic, such as poly[2-methoxy-5-(2'-ethyl-hexyloxy)-1,4-phenylene vinylene] (also referred to as "MEH-PPV"). In this embodiment, the content of nanoparticles 14 by volume is at least 50%. As should be immediately apparent, the host matrix 12 need not be the material enumerated. Moreover, volumetric content of nanoparticles 14 may be greater than or less than 50% without departing from the scope of the invention.

With respect to the host matrix 12, it is noted that the host material 12 need not be a single layer of material. To the contrary, one variation of the invention contemplates that the host material 12 may comprise a series of layers, stacked one on top of the other or disposed one next to the other. It is believed that these different layers may comprise different host matrices 12. Similarly, the invention is not limited to the inclusion of a single type of nanoparticle 14 within a host matrix 12. The compositions of the nanoparticles 14 may differ from one nanoparticle 14 to the next. Alternatively, the composition of the nanoparticles 14 may differ depending upon the composition of the host matrix 12. The various permutations of host matrices 12, nanoparticles 14, and composite layers 10 are large, as should be appreciated by those skilled in the art. The invention is intended to encompass these many variations and alternatives.

As should be appreciated by those skilled in the art, the cross-section for photoelectric absorption of gamma radiation for a material increases as the fifth-power of average Z. Since the nanoparticles 14 are expected to be made from one or more materials with atomic numbers greater than the materials forming the host matrix 12 (e.g., higher Z materials than the host matrix 12), impingent gamma radiation is expected to interact primarily with the nanoparticles 14 rather than with the host material 12. Of course, both interactions are anticipated to occur.

The above discussion was primarily concerned with the detection of gamma radiation. For detecting neutrons, the preferred embodiment uses low Z material (e.g., average Z less than 12) as a host material. Low-Z nuclei are more effective for slowing down neutrons. This interaction between neutrons and low-Z nuclei may produce gamma rays and other secondary particles. The secondary gamma rays effectively interact with the high-Z nanoparticles, creating ionization products that are collected by electrodes as described above. In an alternative embodiment, the host material includes natural or enriched (i.e., with Boron-10) Boron, which is highly efficient at capturing thermal neutrons.

In the embodiment illustrated in FIG. 1, the host matrix 12 and nanoparticles 14 are sandwiched between an upper electrode 28 and a lower electrode 30. The two electrodes 28, 30, which are also parts of the composite layer 10, permit a voltage to be applied between the electrodes 28, 30 to establish an electric field 32. When the composite layer 10 is exposed to radiation, charge carriers (also referred to as charged particles) will be generated. The electric field 32 acts on charged particles (e.g., electrons and holes) within the composite layer 10. As a result, the electric field 32 provides the electromotive force for the charged particles within the composite layer 10.

In one variation, it is contemplated that the composite layer 10 formed from the host matrix material 12, the nanoparticles 14, the upper electrode 28, and the lower electrode 30 may be formed from flexible materials. In this variation, it is contemplated that the composite layer 10 may be bendable around a radius. In this contemplated variation, the composite layer may be bent so that it may be positioned adjacent to a non-planar surface. With respect to the flexibility of the composite layer, the material may be entirely flexible, partially flexible, or semi-flexible, as required for a particular implementation. This may include, but is not limited to, an instance where the composite layer may be folded upon itself. Other variations should be apparent to those skilled in the art.

As discussed above, and as should be appreciated by those skilled in the art, the electric field 32 acts on the charged particles so that they are transported through the composite layer 10 to one of the two electrodes 28, 30. The same electrodes 28, 30 are then utilized to collect electrical signals resulting from ionization charge transport in the composite layer 10. The electrical signals may be directed to a signal processor (including a computer) to provide an assessment of the incident radiation 34. Although the description of incident radiation applies mostly to gamma-rays, it is clear to those expert in the art that similar considerations will apply for non-gamma forms of ionizing radiation, for example neutrons or protons.

Figure 4:
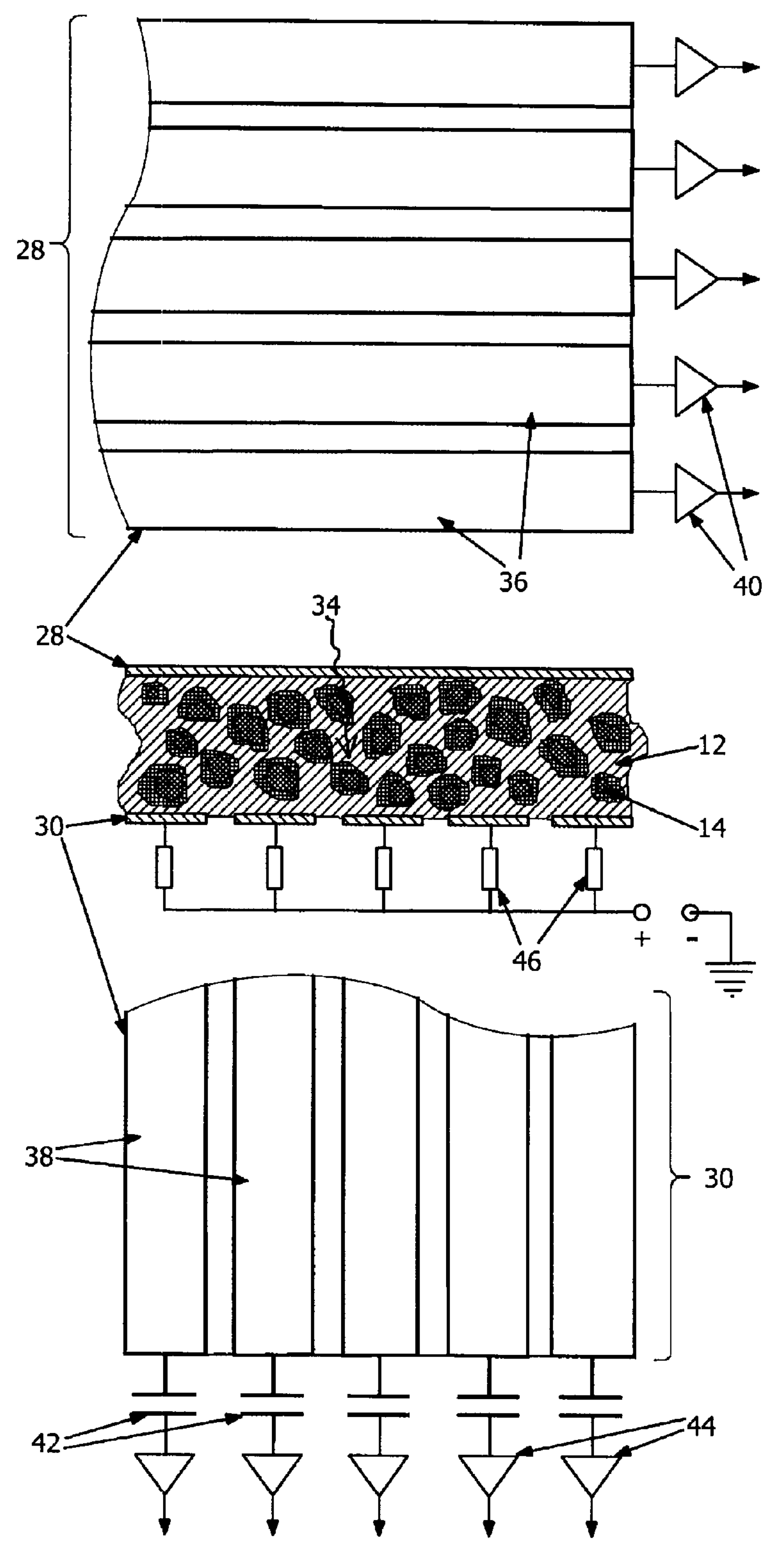
FIG. 4 is a tri-partite illustration, showing a partial top view, a partial cross-sectional side view, and a partial bottom view of a second embodiment of one layer of a radiation detector constructed according to the invention.

As shown in FIG. 1, a basic building block of the invention consists of composite layer 10. In one embodiment, as shown in FIG. 4, the electrodes 28, 30 are electrically divided into sub-sections so that each sub-section may produce its own signal. In this embodiment, the upper electrode 28 is disposed in the form of a plurality of upper strips 36 across the upper surface of the host material 12. Similarly, the lower electrode 30 is disposed in the form of lower strips 38 across the lower surface of the host material 12 (in another orientation, e.g. perpendicular, to the strips 36 forming the upper electrode 28). Accordingly, signals from some or all of the sub-sections 36, 38 may be compared to signals from others of the sub-sections 36, 38. Moreover, signals from respective ones of the strips 36, 38 may be summed to estimate the energy deposited by the incident radiation and secondary particles within the composite layer 10. In addition, signal distribution across respective ones of the strips 36, 38 may be weighted by different methods (e.g., center of gravity) to estimate the position of the interaction of the incident radiation within the composite layer 10. Other manipulations of the signals also may be employed, as should be appreciated by those skilled in the art.

As should be appreciated by those skilled in the art, the upper and lower electrodes 28, 30 may include several electrodes arranged with respect to one another. For example, it is contemplated that the upper electrode may include several electrode layers, stacked one on top of the other. A similar arrangement may be employed for the lower electrode 30. When plural electrodes are used, the different electrodes may be made from different materials, as should be appreciated by those skilled in the art.

In the embodiment illustrated in FIG. 4, the upper electrode 28 and the lower electrode 30 are affixed directly to the upper and lower surfaces of the host matrix 12. As should be apparent to those skilled in the art, the electrodes 28, 30 need not be in direct contact with the host matrix 12. To the contrary, it is contemplated that one or more layers of materials may be disposed between the host matrix 12 and the electrodes 28, 30. As such, the electrodes 28, 30 are not disposed directly on the host matrix 12. Instead, the electrodes 28, 30 are positioned a distance from the host matrix 12 containing the nanoparticles 14. In this embodiment, the signals on the electrodes 28, 30 are produced as induced charges.

As illustrated in FIG. 4, the upper strips 36 may be connected, directly or indirectly, to upper amplifiers 40. The upper amplifiers 40 may be connected, in turn, to appropriate electronics to read out the electrical signals detected by the upper strips 36. Alternatively, amplifiers need not be employed depending upon the readout electronics employed for the particular configuration of the detector. Although the above describes the use of electronics, it is obvious to those experienced in the field that other readout mechanisms may be employed, for example, photonics.

As for the electronics, there are several contemplated embodiments. For example, the electronics may include additional amplifiers to boost the strength of the signals received by the strips 36. Other data acquisition components also may be employed, e.g. signal digitizers. As should be apparent to those skilled in the art, the electronics may include one or more processors for analog or digitized signals and data storage devices. Processor(s) may be employed to interpret the electrical signals and provide an indication of the strength and type of the impingent radiation. Storage device(s) may be employed to store the data for future reference.

With respect to the lower strips 38, it is contemplated that the signals may be directed to capacitors 42 before being directed to lower amplifiers 44. Capacitors also may be employed with respect to the upper strips 38, as should be apparent to those skilled in the art. Signals from the lower strips 38 of the lower electrode 30 may then be processed by electronics in the same manner as the signals collected by the upper electrode 28.

With continued reference to FIG. 4, it is also contemplated that one or more resistors 46 may be connected to the lower strips 38. The same configuration also may be applied to the upper strips 36, although this configuration is not shown in FIG. 4. As noted above, other methods of applying an electrical field, for example, active circuitry (such as operational amplifiers or other power supplies) may be used instead of capacitors 42. There are a number of reasons for employing resistors and capacitors as illustrated in FIG. 3. Among a large list of reasons, resistors and capacitors help to reduce cross-talk between separate ones of the electrode strips 36, 38.

Figure 5:
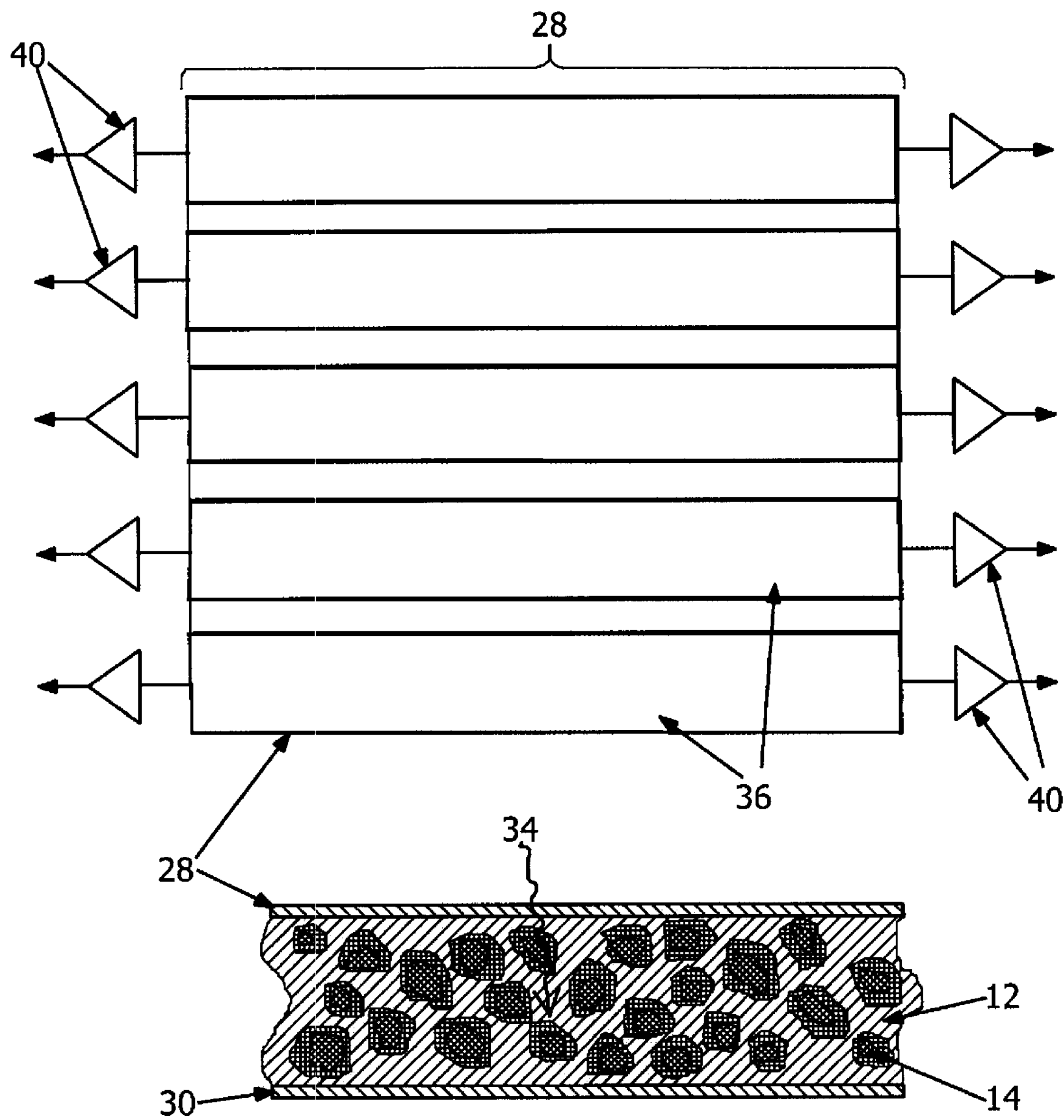
FIG. 5 is a bi-partite illustration, showing a partial top view and a partial, cross-sectional side view of a third embodiment of one layer of a radiation detector constructed according to the invention.

If the electrodes 28, 30 are conductive, then the configuration illustrated in FIG. 4 may be employed. Alternatively, the electrodes 28, 30 may be resistive. If so, a configuration akin to that illustrated in FIG. 5 may be employed. In FIG. 5, signals may be extracted (or read) from either or both ends of the strips 36, 38. In this embodiment, the position of the radiation interaction within the layer along the strips may be obtained by analyzing and comparing signals from both ends of the strips, e.g., by analyzing respective amplitudes of the signals or by analyzing the difference in signal time-of-arrivals at the ends of a strip.

With respect to FIG. 5, it is noted that only the upper strips 36 are illustrated. However, the same approach may be applied to the lower strips 38, as should be appreciated by those skilled in the art.

As is apparent in FIGS. 4 and 5, the upper strips 36 and the lower strips 38 are linear in disposition across the surface of the host matrix 12. However, this configuration is not critical to operation of the invention. To the contrary, the strips 36, 38 may be configured in any number of different ways without departing from the scope of the invention. For example, the strips 36, 38 may be applied to the host matrix 12 in a non-linear manner. Further, the strips 36, 38 may be applied in a meandering pattern or a recursive pattern, as should be appreciated by those skilled in the art.

Figure 6:
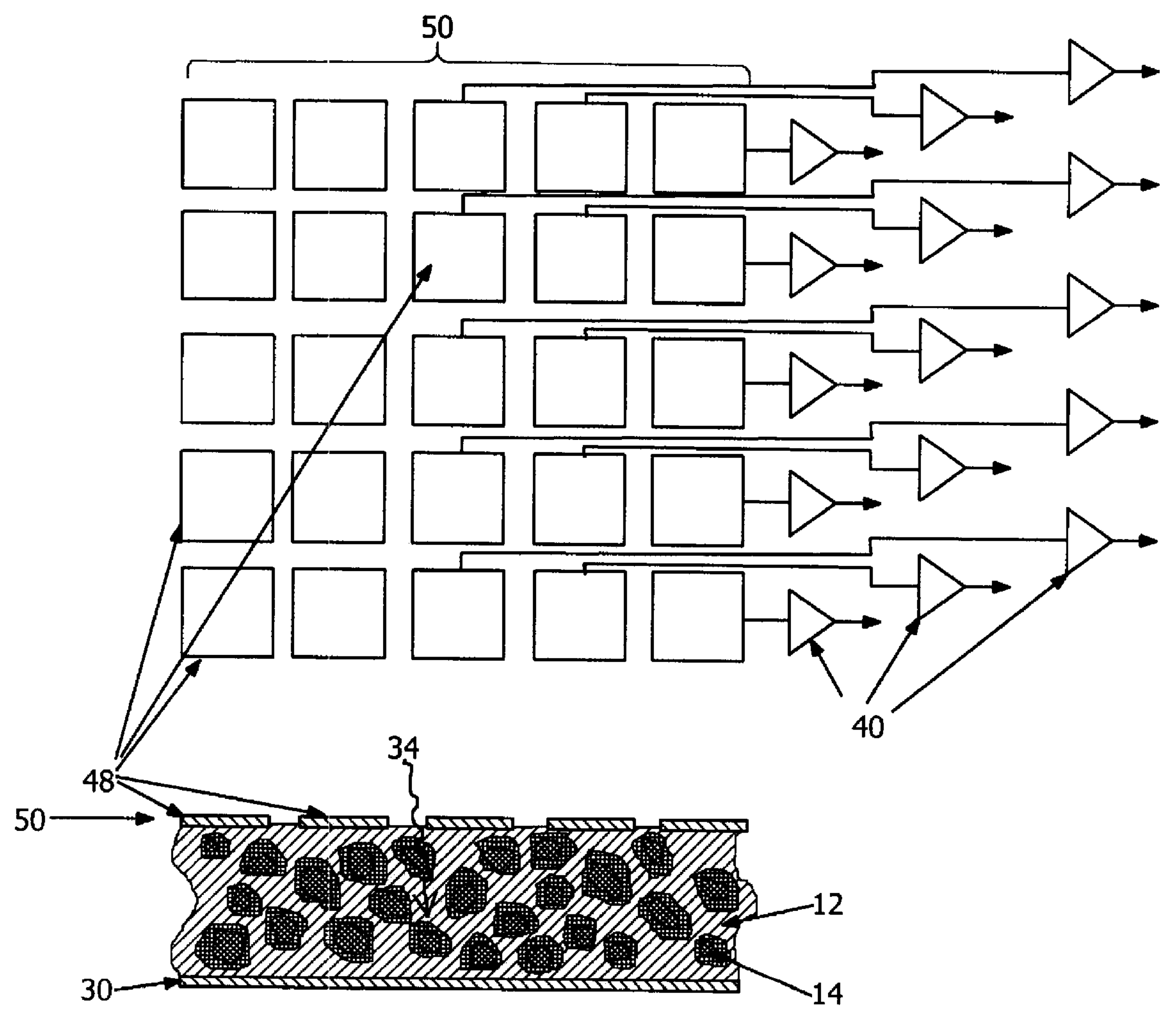
FIG. 6 is a bi-partite illustration, showing a partial top view and a partial, cross-sectional side view of a fourth embodiment of one layer of a radiation detector constructed according to the invention.

FIG. 6 illustrates one contemplated embodiment for the upper electrode 50. In this embodiment, the upper electrode 50 is segmented into a plurality of discrete sections 48 (or pads). In this figure, the discrete sections 48 are shown as square elements disposed across the upper surface of the host matrix 12. As should be apparent to those skilled in the art, a square configuration for the discrete sections 48 of the upper electrode 50 is not required for the invention. Other configurations also are contemplated to be employed without departing from the scope of the invention. For ease or reference, the composite layer is provided with reference number 52 to distinguish this embodiment from prior embodiments.

Figure 7:
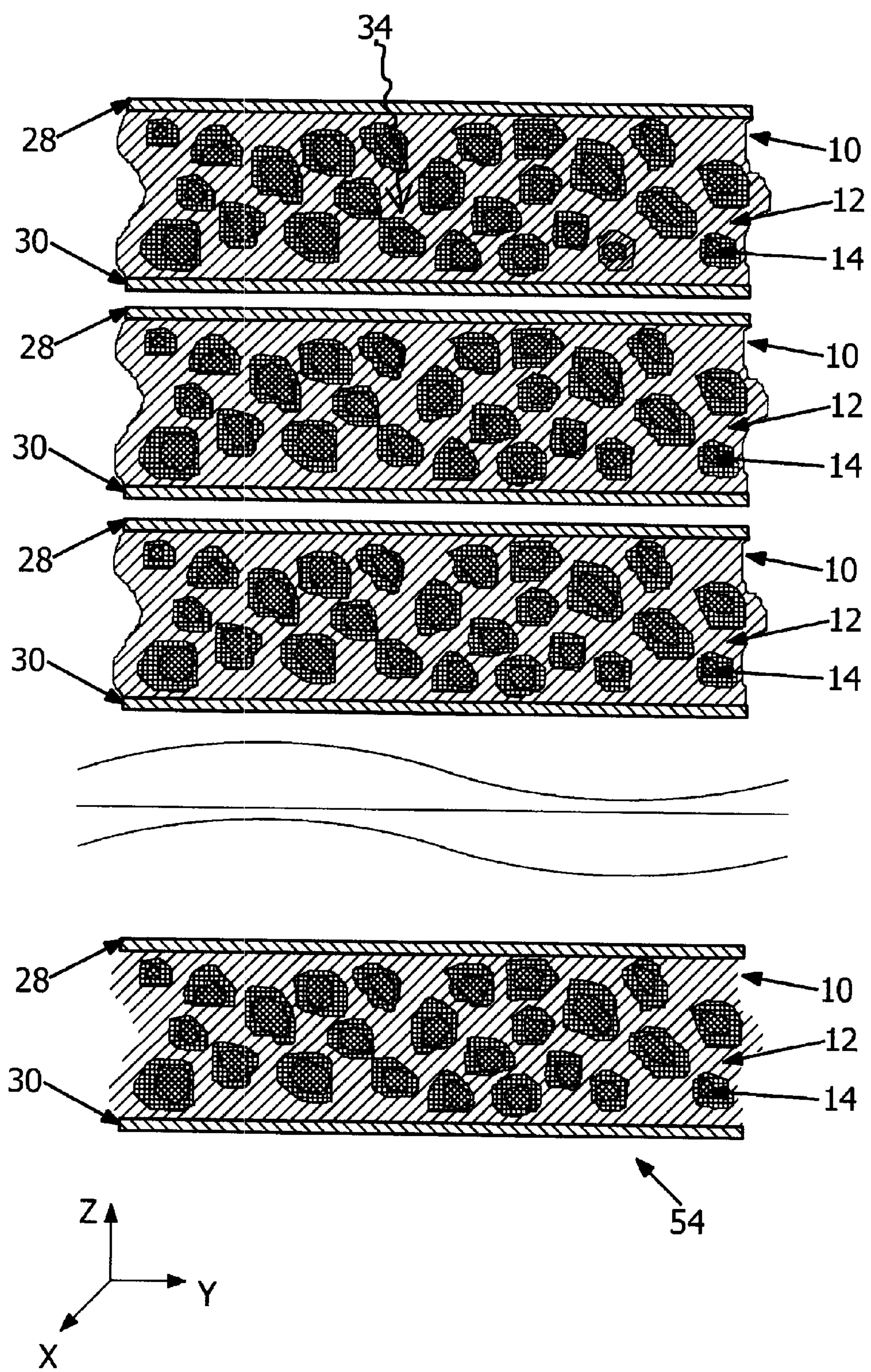
FIG. 7 is a partial cross-sectional side view of a radiation detector including multiple layers, which is constructed according to the invention.

In another contemplated embodiment, which is illustrated in FIG. 7, a direct-detection device 54, also referred to as a multilayer detector configuration, is constructed from several composite layers 10, 52 stacked on top of one another. Each composite layer 10, 52 may be constructed in accordance with the embodiments described in connection with FIGS. 1-6. While it is contemplated that all of the composite layers 10, 52 will have the same configuration as one another, such a construction is not required. For example, it is contemplated that the composite layer 10 illustrated in FIG. 4 may be used together with the composite layer 52 illustrated in FIG. 6.

Figure 8:
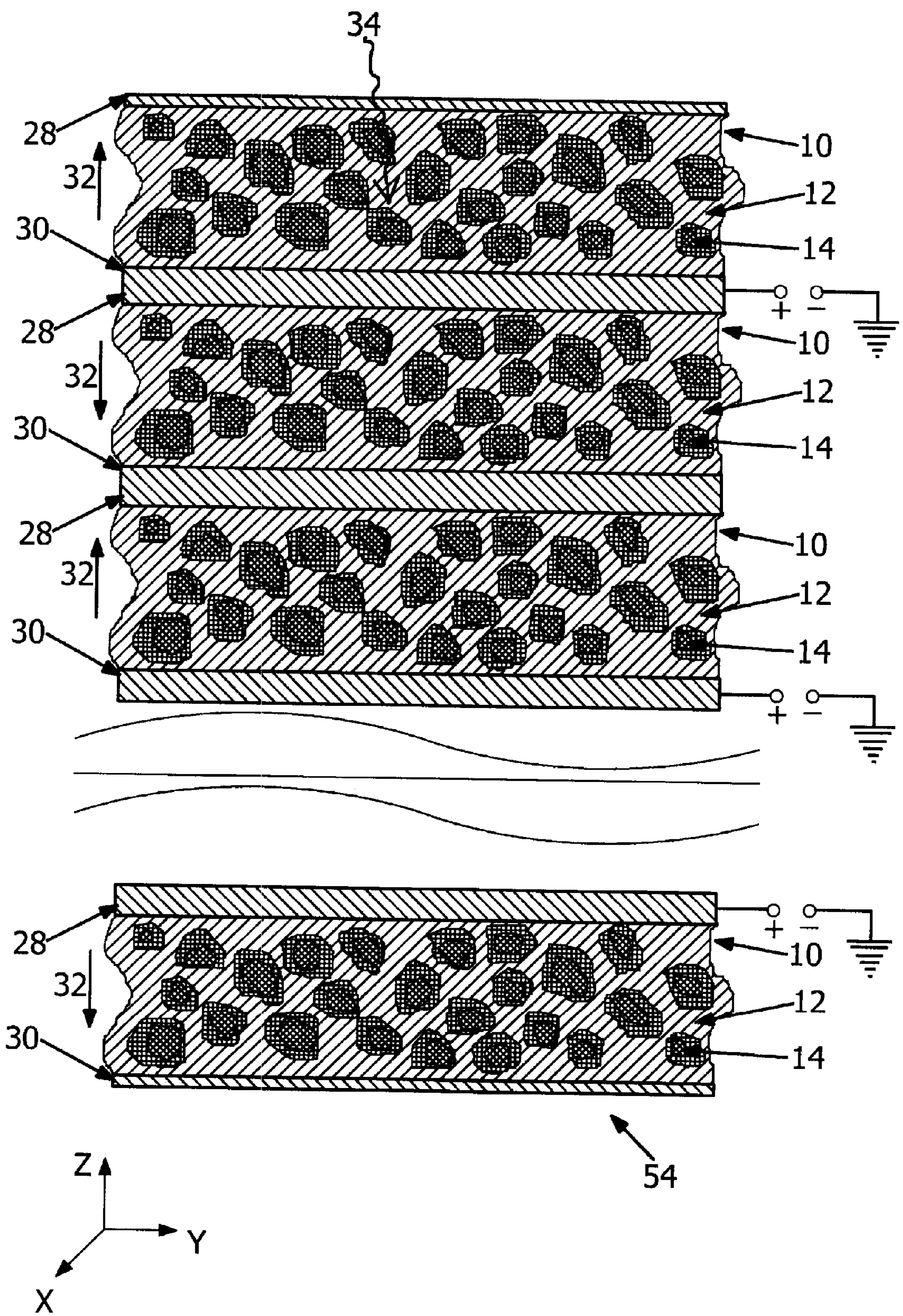
FIG. 8 is another partial cross-sectional side view of a radiation detector including multiple layers, which is constructed according to the invention.

Other variations also are contemplated. For example, each layer 10 may have its own electrodes 28, 30, as shown in FIG. 7, or neighboring layers may share the electrodes as shown in FIG. 8.

In the multilayer detector configuration 54, each of the composite layers 10 are constructed in accordance with the embodiment illustrated in FIG. 4, for example. The position of the radiation interaction in the X and Y axes is derived from sub-section comparisons as in the single composite layer 10 example described above, while the Z position of each interaction is derived by comparing the sums of layer sub-signals from each layer 10. The multi-layer configuration 54 provides efficient detection for radiation incident from many directions.

In one contemplated embodiment, the nanoparticles 14 are of similar sizes and shapes to each other within the direct-detection device 54, and their size is in the range from 1 nanometer to 100 nanometers. In alternative embodiments, the nanoparticles 14 may vary in size or shape within a single direct-detection device 54, with their sizes ranging from 0.1 nanometers to 1000 micrometers. Other ranges of sizes are also contemplated.

In one contemplated embodiment, in the composite layer 10, 52, the nanoparticle percentage content is above 50% by volume, although lower percentage contents may be used in alternative embodiments.

In one contemplated embodiment, the quantum dots 14 are solely composed of lead sulfide. The purpose of having guest particles 14 with high atomic numbers (such as lead) is to increase cross-section of the interaction with gamma- and X-rays via photo-absorption, and hence increase detection efficiency. Since the cross-section for photoelectric absorption increases as the fifth-power of atomic number, the detection efficiency of lead sulfide for high-energy gamma rays (e.g., 500 keV) is ten times greater than materials typically used as direct-detecting solid state detectors (e.g., cadmium telluride), and a thousand times greater than silicon.

In an alternative embodiment, the nanoparticles 14 (also referred to as quantum dots) are composed of a material other than lead sulfide. For example, the quantum dots 14 may be composed of an amorphous semiconductor, a crystalline semiconductor, an insulator, lead telluride, lead selenide, mercuric iodide, thallium bromide, cadmium zinc telluride, or cadmium telluride, or of a mixture of these compounds.

In an alternative embodiment, the quantum dots 14 may be composed of a low atomic number material (e.g., average Z below 30), such as silicon. Such a low-Z material may be used in a Compton camera, in order to reduce the Doppler broadening effect that otherwise may degrade spatial and angular resolution.

With respect to the atomic number for one of the materials comprising the nanoparticles 14, it is contemplated that at least one of the elements will have an atomic number greater than 45. The higher the atomic number, the higher are the expectations that the nanoparticles 14 will generate charge carriers upon interaction with the radiation. Lead has an atomic number of 82. Because of the high atomic number (Z) and because of its high density, lead and its compounds are well suited for the nanoparticles 14.

In another alternative embodiment, each nanoparticle 14 is covered with another an outer coating 16, as discussed above. Encapsulating the nanoparticles 14 with the outer coating 16 may reduce trapping of electrically charged carriers at the boundaries between guest particles 14 and the host matrix 12. In one contemplated embodiment, the nanoparticle surfaces are passivated with a wide band-gap inorganic type shell (i.e. ZnS, PbSe) or with an organic shell (i.e. primary amines—alkylamine or dodecylamine). Other materials for the outer coating 16 include an amorphous semiconductor, a crystalline semiconductor, an insulator, lead telluride, mercuric iodide, thallium bromide, cadmium zinc telluride, or cadmium telluride, or of a mixture of these compounds.

In another embodiment, the nanoparticles 14 are shaped so that the axes are not equal in size, and may be described as nano-rods. Other alternative embodiments include shapes such as tubes, wires or any other regular or irregular shape. If nano-rods, tubes, or wires are employed, it is contemplated that the nano-rods, tubes, or wires should be oriented with their longitudinal axis parallel (or as close to parallel as practicable) to the direction of the electric field 32.

Figure 9:
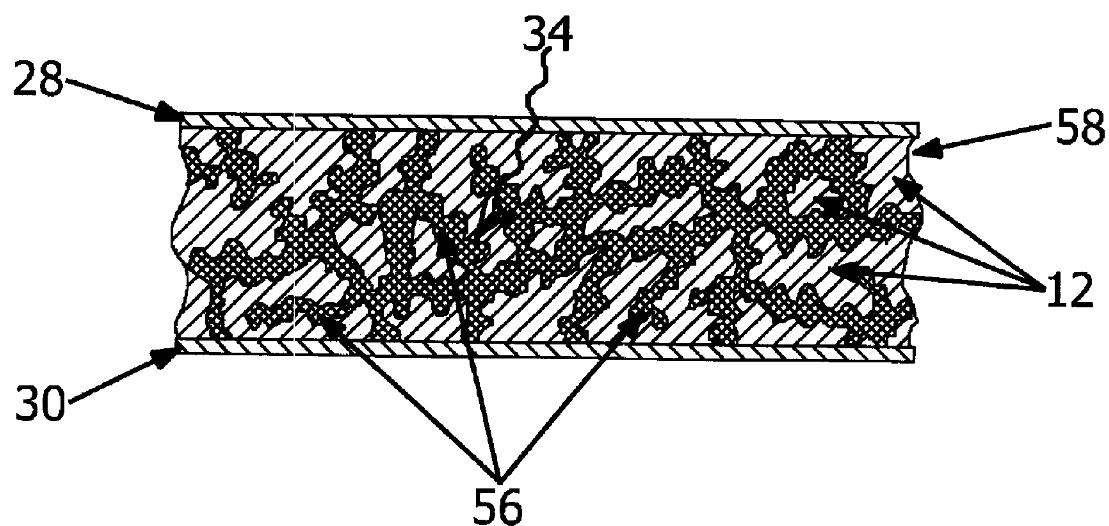
FIG. 9 is an enlarged, partial cross-sectional side view of one layer of a radiation detector constructed according to the invention, showing guest particles disposed within a network.
Figure 10:
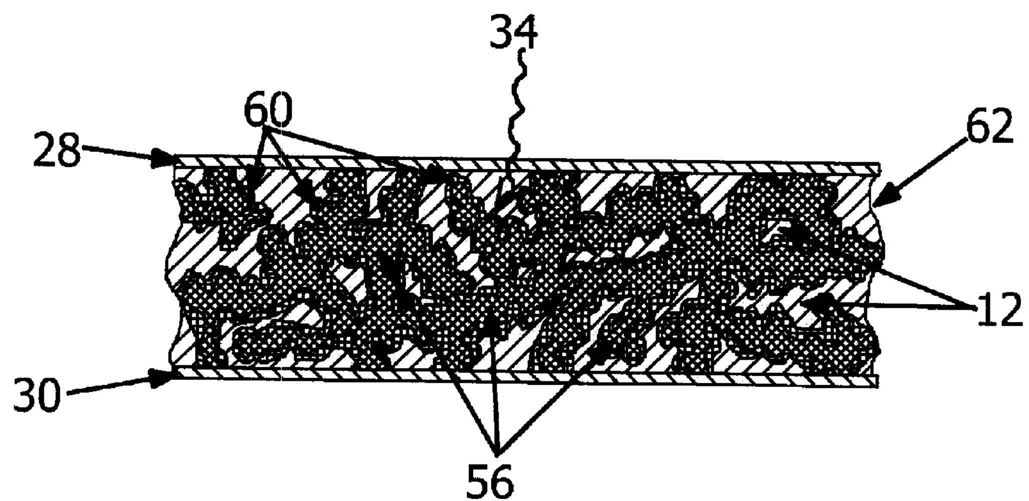
FIG. 10 is an enlarged, partial cross-sectional side view of one layer of a radiation detector constructed according to the invention, showing guest particles disposed in a network with an overlayer.

Other alternative embodiments also are intended to be encompassed by this disclosure, as illustrated in FIGS. 9 and 10. In these figures, the nanoparticles 14 are approximated to one another to form nanonetworks 56, thereby creating a composite layer 58. The nanonetworks 56 may form one or more pathways for charge carriers (for example, quantum tunnels) throughout the composite layer 58. A nanonetwork 56 may be made of bare nanoparticles as in FIG. 9, or the nanonetwork may be capped with one or more overlayers 60 as shown in the composite layer 62 in FIG. 10. The overlayer 60 may facilitate electron-hole separation, as discussed above. In one contemplated embodiment, the overlayer 60 is made of semiconductor type material different from guest particle. As an example, the overlayer 60 may be PbSe or ZnS.

In one contemplated embodiment, under an applied electric field the composite material enables transport of charges created by ionization from incident radiation. The drift length for a charge carrier is a product of three variables: (1) the applied electric field, (2) the charge-carrier lifetime, and (3) the charge carrier mobility. The applied electric field is measured in "V/cm." The charge-carrier lifetime is measured in "sec." The charge carrier's mobility is measured in "$cm^2$/sec·V." Accordingly, when a product of these three variables is calculated, the product is expressed in "cm." The product of these three variables is referred to as the "mobility-lifetime-field strength product" and represents average drift length for each type of the charge carriers (e.g., for electrons or holes).

For ease of discussion, the mobility-lifetime-field strength product is provided with the identifier "MLFP." The applied electric field is designated by "E." The charge carrier lifetime is designated by "t." The charge carrier's mobility is designated by "M." As such, the relationship between these variables may be expressed by equation 1, below.

$$MLFP=E\cdot t\cdot M \quad eq(1)$$

It is contemplated that the mobility-lifetime-field strength product (MLFP) for one or more charge-carriers is greater than or equal to one tenth of the thickness of the host matrix 12. If the thickness of the host matrix is designated by "d," the relationship between the MLFP and the thickness, d, may be expressed according to equation 2, below.

$$MLFP\geqq 0.1d \quad eq(2)$$

From this equation, it is possible to define one further relational aspect of the invention. Specifically, the ratio of MLFP/d is greater than or equal to 0.1. The 1/10 (or 0.1) factor may be referred to as the distance ratio and be provided the designation "DR."

As may be appreciated by those skilled in the art, the distance ratio, DR, may be greater than 1/10. In fact, it is contemplated that the DR will be greater than 0.5 (or ½) in many instances to assure accurate and efficient operation of the detector. A factor of 0.5 is expected to work well because a DR of 0.5 means that if a charge carrier is created at a point equidistant between the upper electrode 28 and the lower electrode 32, it is it is likely that the charge carrier will drift to one of the electrodes before it recombines with its oppositely-charged counterpart or is trapped (e.g., by an impurities or a ligands). Even better operation of the detector is expected if DR is greater than or equal to 1.0.

It is also contemplated that the composite material is engineered so that the lifetime-mobility product for one or more charge carriers is greater than $10^{-4}$ $cm^2/V$. In an alternative embodiment, the lifetime-mobility product may be greater than $10^{-7}$ $cm^2/V$.

In another contemplated embodiment, the host matrix 12 is made of one or more semiconducting organic polymers. Semiconducting organic polymers (e.g., polyaniline, polyvinylcarbazole, polyacetylene) generally have a framework of alternating single and double carbon-carbon bonds. The electrons that constitute the n-bonds are delocalized over the entire molecule. In a semiconducting polymer the electrons and holes are typically bound to one another as mobile excitons, which may be split at interfaces (e.g., between an electrode and the polymer). The electronic behavior of organic polymers may be dramatically altered with chemical doping. In the preferred embodiment, the host material is the semiconducting polymer poly[2-methoxy-5-(2'-ethyl-hexyloxy)-pphenylene vinylene] (MEH-PPV). Alternative embodiments include other semiconducting polymers such as poly [vinyl carbazole] (PVK), poly[3-hexylthiophene] (P3HT) and phenyl-C61-butyric acid methyl ester (PCBM), PAn, poly(N-vinylcarbazole) (PVCZ), PA and polythiophenes (PThs).

In an alternative embodiment, the use of polymers with interfaces of differing electron affinities may enhance the probability of electron transfer between molecules (the junction formed at donor-acceptor interface is similar to a semiconductor heterojunction), and therefore improve charge transport.

In an alternative embodiment, the host matrix 12 is composed of semiconducting materials other than plastic, for example silicon, germanium, or gallium arsenide, or of an insulator-type material. The latter may be better choice for the configuration shown in FIGS. 9 and 10 if the nanoparticle network 56 enables transport of the charge carriers produced by ionization.

In one contemplated embodiment, the electrodes 28, 30, 50 are made of aluminum and indium tin oxide (ITO). In alternative embodiments, any electrically conductive or semiconductive material or materials may be used. Gold, silver, calcium, copper, and tin oxide are non-limiting examples of alternatives.

In another embodiment, a thin layer or layers of a different material (e.g., gold) may be introduced between one or more of the electrodes 28, 30, 50 and the composite layers 10, 52, 58. Such layer or layers might, for example improve interface between the host matrix 12 and the electrodes 28, 30, 50.

In one contemplated embodiment, one or more of the electrodes 28, 30, 50 are made of a material that forms a Schottky junction between the composite material and the electrode. A typical Schottky diode (or junction) is composed of a metal electrode in contact with a semiconductor. The metal-semiconductor junction in some cases may act as a rectifying Schottky barrier, similar to the p-n semiconductor-semiconductor junction employed in conventional diodes. The rectifying properties of the Schottky barrier depend on the metal's work function, the band gap of the intrinsic semiconductor, and the type and concentration of dopants in the semiconductor. In a reversed-biased Schottky diode, leakage current is reduced, as compared to the case in which a Schottky barrier does not exist.

In another alternative embodiment, the composite layer consists of p- and n-type layers. The layers may be either of the same material with different doping, or of different composite materials. Reduced leakage current may be effected by operating such configuration as reverse biased pn-diode.

In one contemplated embodiment, the voltage applied to the reverse biased diode is sufficient to fully deplete the composite material. In alternative embodiment, the voltage may be sufficient to partly deplete the composite material.

In one contemplated embodiment, one or more of the electrodes consist of pads 48 (FIG. 6) that are individually read out with individual amplifying electronic modules. In an alternative embodiment, one or more of the electrodes may shape the electric field.

In still another contemplated embodiment, the electrodes are read out with charge-division or multiplexing readout so that individual amplifiers are not necessary for each pad 48. In an alternative embodiment, the electrodes consist of conductive (FIG. 4) or resistive (FIG. 5) strips.

In another alternative embodiment, the system of electrodes to be constructed is similar to those in silicon drift detector, where the drift time is measured to derive position of the radiation interaction.

In one embodiment, the direct-detection devices described in connection with FIGS. 4, 5, and 6 are configured as arrays as in FIGS. 7 and 8 in order to increase detection efficiency.

The device may be used for particle fluence measurements in an accumulation mode or for single particle counting in pulse mode. In one contemplated embodiment, the device operates in a pulse mode to enable the particle energy to be characterized via, for example, analysis of charge, current or voltage generated on one or more than one electrode or of sum the latter.

Figure 11:
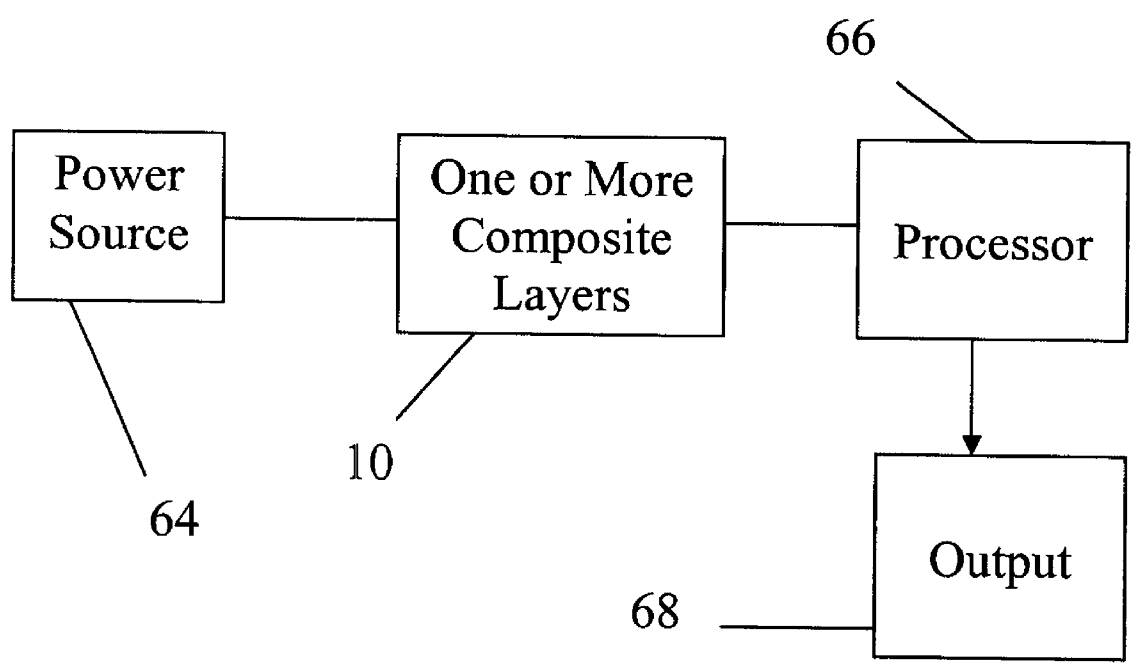
FIG. 11 is a schematic, block diagram of a detector constructed in accordance with the invention.

With reference to FIG. 11, the invention also encompasses a detector and a method for detecting radiation in one or more assemblies for detecting radiation.

In accordance with the discussion above, a single assembly includes a host matrix 12 defining a first surface and a second surface. The first and second surfaces define a thickness between them. A plurality of particles 14 are suspended within the host matrix 12. The particles 14 are capable of generating at least one charge carrier upon interaction with radiation 34. The radiation 34 may be photonic or may include particles (such as electrons, neutrons, etc.).

A first electrode 28 is disposed adjacent to the first surface of the host matrix 12. A second electrode 30 is disposed adjacent to the second surface of the host matrix 12. As noted above, the host matrix 12, the first electrode 28, and the second electrode 30 collectively form a composite layer 10. One or more composite layers 10 may be assembled together.

A power source 64 is operatively connected to one of the first and second electrodes 28, 30 in the composite layer(s) 10. A processor 66 also is connected to at least one of the first and second electrodes 28, 30. The power source 64 is configured to establish an electric field 32 between the first and second electrodes 28, 30. As should be appreciated, in the case of multiple composite layers 10 disposed adjacent to one another, the electric field 32 is established in one or more of the separate composite layers 10.

The electric field 32 is established such that a mobility-lifetime-field strength product for the at least one charge carrier is defined by the equation MLFP=E·t·M, where MFLP is a value for the mobility-lifetime-field strength product, E is a value for the electric field between the first and second electrodes, t is a value for the lifetime of the at least one charge carrier, M is a value for the mobility of the at least one charge carrier, and a ratio of the mobility-lifetime-field strength product to the thickness between the first and second surfaces of the host matrix is greater or equal to 0.1.

The method includes establishing the electrical field 32 between the first and second electrodes 28, 30. A charge carrier is generated as a result of interaction between the radiation and at least one of the plurality of particles 14 or host material 10. The charge carrier produces an electrical signal on at least one of the first and second electrodes 28, 30 by virtue of being collected or via induced charge. The electrical signal is then provided to the processor 66. The electrical signal is then processed to establish characteristics associated with the radiation. The characteristics of the radiation may be outputted from the processor 66 as output 68.

As should be understood by those skilled in the art, the processor 66 may operate in an accumulation mode where the electrical signals are processed to characterize fluence of particles of the radiation 34. In other words, the fluence of the radiation 34 may be assessed. Alternatively, the processor 66 may operate in a pulse mode. In this embodiment, the electrical signals are processed to characterize individual particles of the radiation 34. In other words, among other characteristics, the energy of individual particles of the radiation 34 may be determined by the processor 66. Still other characteristics of the radiation 34 may be measured or assessed by the processor 66, as should be understood by those skilled in the art.

Other embodiments also are contemplated to be encompassed by the description of the invention provided herein, as should be appreciated by those skilled in the art, and as broadly recited by the claims that follow.

What is claimed is:

1. An assembly for converting radiation to electrical energy, comprising:

a host matrix of inorganic semiconducting material defining a first surface and a second surface and a thickness between the first and second surfaces;

a plurality of nanoparticles interspersed within the host matrix, the plurality of nanoparticles being capable of generating at least one charge carrier upon interaction with the radiation;

a first electrode disposed adjacent to the first surface of the host matrix; and a second electrode disposed adjacent to the second surface of the host matrix.

2. The assembly of claim 1, wherein the host matrix is silicon.

3. The assembly of claim 1, wherein the host matrix comprises a plurality of host matrix layers disposed adjacent to one another to define the thickness between the first and second surfaces.

4. The assembly of claim 3, wherein the plurality of host matrix layers each comprise a flexible material.

5. The assembly of claim 3, wherein at least one of the plurality of host matrix layers differs compositionally from others of the host matrix layers.

6. The assembly of claim 3, wherein at least two of the plurality of host matrix layers form a pn diode.

7. The assembly of claim 1, wherein the host matrix, first and second electrodes each comprise a flexible material.

8. The assembly of claim 1, wherein the plurality nanoparticles each comprise at least ten atoms.

9. The assembly of claim 1, further comprising a power source, operatively connected to at least one of the first and second electrodes, wherein the power source is configured to establish an electric field between the first and second electrodes, wherein a mobility-lifetime-field strength product for the at least one charge carrier is defined by the equation MLFP=E·t·M, wherein MFLP is a value for the mobility-lifetime-field strength product, wherein E is a value for the electric field between the first and second electrodes, wherein t is a value for the lifetime of the at least one charge carrier, wherein M is a value for the mobility of the at least one charge carrier, and wherein a ratio of the mobility-lifetime-field strength product to the thickness between the first and second surfaces of the host matrix is greater than or equal to 0.1.

10. The assembly of claim 1, wherein the plurality of nanoparticles comprise at least one material selected from a group comprising an amorphous semiconductor, a crystalline semiconductor, an insulator, boron, silicon, lead sulfide, lead telluride, lead selenide, mercuric iodide, thallium bromide, cadmium zinc telluride, and cadmium telluride.

11. The assembly of claim 1, wherein the plurality of nanoparticles comprise at least one element with an atomic number greater than 45.

12. The assembly of claim 1, wherein the nanoparticles have at least one shape selected from a group comprising spherical, amorphous, rod-shaped, tubular, cuboid, rectangular, and pyramidal.

13. The assembly of claim 1, wherein the plurality of nanoparticles occupy at least 50% by volume of the host matrix.

14. The assembly of claim 1, wherein at least one of the first and second electrodes comprise at least one material selected from a group comprising aluminum, indium tin oxide, electrically conductive materials, semiconductive materials, gold, silver, calcium, copper, and tin oxide.

15. The assembly of claim 1, wherein at least one of the first and second electrodes comprise at least one subsection.

16. The assembly of claim 15, wherein at least one subsection comprises a plurality of strips disposed adjacent to one another.

17. The assembly of claim 15, wherein at least one subsection comprises a plurality of pads disposed adjacent to one another.

18. The assembly of claim 1, wherein the host matrix and at least one of the first and second electrodes form a Schottky diode.

19. The assembly of claim 1, wherein the host matrix and at least one of the plurality of nanoparticles form at least one heterojunction.

20. An assembly for converting radiation to electrical energy, comprising:

a host matrix defining a first surface and a second surface and a thickness between the first and second surfaces;

a plurality of nanoparticles interspersed within the host matrix, the plurality of nanoparticles being capable of generating at least one charge carrier upon interaction with the radiation;

a first electrode disposed adjacent to the first surface of the host matrix; and a second electrode disposed adjacent to the second surface of the host matrix, wherein at least one outer coating encapsulating at least one of the plurality of nanoparticles, the at least one outer coating changing the electrical behavior of the at least one nanoparticle.

21. The assembly of claim 20, wherein the at least one outer coating comprises a plurality of coating layers.

22. The assembly of claim 20, wherein the at least one outer coating partially encapsulates the at least one of the plurality of nanoparticles.

23. The assembly of claim 20, wherein the at least one outer coating completely encapsulates the at least one of the plurality of nanoparticles.

24. The assembly of claim 20, wherein the at least one outer coating comprises at least one material selected from a group comprising an inorganic material, ZnS, PbSe, an organic material, primary amines, alkylamine, and dodecylamine, an amorphous semiconductor, a crystalline semiconductor, an insulator, silicon, lead sulfide, lead telluride, mercuric iodide, thallium bromide, cadmium zinc telluride, and cadmium telluride.

25. The assembly of claim 20, wherein an inner portion and the at least one outer coating of the nanoparticles provide at least one heterojunction.

26. The assembly of claim 20, wherein at least one heterojunction exists between the at lest one outer coating of the at least one nanoparticle and another outer coating of the at least one nanoparticle.

27. An assembly for converting radiation to electrical energy, comprising:

a host matrix defining a first surface and a second surface and a thickness between the first and second surfaces;

a plurality of nanoparticles interspersed within the host matrix, the plurality of nanoparticles being capable of generating at least one charge carrier upon interaction with the radiation;

a first electrode disposed adjacent to the first surface of the host matrix; and a second electrode disposed adjacent to the second surface of the host matrix, wherein the plurality of nanoparticles enable charge transport from particle to particle in at least one particle network within the host matrix.

28. The assembly of claim 27, further comprising:

an overlayer at least partially encapsulating the at least one nanoparticle network.

29. The assembly of claim 28, wherein the overlayer comprises at least one material selected from a group comprising an amorphous semiconductor, a crystalline semiconductor, an insulator, silicon, lead sulfide, lead telluride, lead selenide, mercuric iodide, thallium bromide, cadmium zinc telluride, and cadmium telluride.

30. A radiation detector, comprising:

a plurality of assemblies for converting radiation to electrical energy, disposed adjacent to one another in a stacked fashion, each of the assemblies comprising:

a host matrix of inorganic semiconducting material defining a first surface and a second surface and a thickness between the first and second surfaces, a plurality of nanoparticles interspersed within the host matrix, the plurality of nanoparticles being capable of generating at least one charge carrier upon interaction with the radiation, a first electrode disposed adjacent to the first surface of the host matrix, and a second electrode disposed adjacent to the second surface of the host matrix.

31. The detector of claim 30, further comprising:

at least one resistance element disposed between at least one of the first and second electrodes and the processor.

32. The detector of claim 30, further comprising:

at least one capacitance element disposed between at least one of the first and second electrodes and the processor.

33. The detector of claim 30, wherein the host matrix and at least one of the first and second electrodes form a Schottky diode.

34. The detector of claim 30, wherein the host matrix comprises at least two layers and the at least two layers form a pn diode.

35. The detector of claim 30, wherein the host matrix comprises a plurality of host matrix layers disposed adjacent to one another to define the thickness between the first and second surfaces.

36. The detector of claim 35, wherein the plurality of host matrix layers each comprise a flexible material.

37. The detector of claim 35, wherein at least one of the plurality of host matrix layers differs compositionally from others of the host matrix layers.

38. The detector of claim 30, wherein the host matrix comprises a flexible material.

39. The detector of claim 30, wherein the plurality of nanoparticles each comprise at least ten atoms.

40. The detector of claim 30, further comprising:

a power source, operatively connected to the first and second electrodes, wherein the power source is configured to establish an electric field between the first and second electrodes, wherein a mobility-lifetime-field strength product for the at least one charge carrier is defined by the equation MLFP=E·t·M, wherein MFLP is a value for the mobility-lifetime-field strength product, wherein E is a value for the electric field between the first and second electrodes, wherein t is a value for the lifetime of the at least one charge carrier, wherein M is a value for the mobility of the at least one charge carrier, wherein a ratio of the mobility-lifetime-field strength product to the thickness between the first and second surfaces of the host matrix is greater or equal to 0.1, and wherein at least one of the first and second electrodes generates an electrical signal associated with at least one of the charge carriers;

a processor for receiving and processing the electrical signal;

at least one amplifier disposed between at least one of the first or second electrodes and the processor to amplify the electrical signal before the electrical signal is provided to the processor.

41. The detector of claim 30, wherein the plurality of nanoparticles comprise at least one material selected from a group comprising an amorphous semiconductor, a crystalline semiconductor, an insulator, boron, silicon, lead sulfide, lead telluride, lead selenide, mercuric iodide, thallium bromide, cadmium zinc telluride, and cadmium telluride.

42. The detector of claim 30, wherein the plurality of nanoparticles comprise at least one element with an atomic number greater than 45.

43. The detector of claim 30, wherein the nanoparticles have at least one shape selected from a group comprising spherical, amorphous, rod-shaped, tubular, cuboid, rectangular, and pyramidal.

44. The detector of claim 30, wherein the plurality of nanoparticles occupy at least 50% by volume of the host matrix.

45. The detector of claim 30, wherein at least one of the first and second electrodes comprise at least one material selected from a group comprising aluminum, indium tin oxide, electrically conductive materials, semiconductive materials, gold, silver, calcium, copper, and tin oxide.

46. The detector of claim 30, wherein at least one of the first and second electrodes comprise at least one subsection.

47. The detector of claim 46, wherein at least one subsection comprises a plurality of strips disposed adjacent to one another.

48. The detector of claim 46, wherein at least one subsection comprises a plurality of pads disposed adjacent to one another.

49. A radiation detector, comprising:

a plurality of assemblies for converting radiation to electrical energy, disposed adjacent to one another in a stacked fashion, each of the assemblies comprising:

a host matrix defining a first surface and a second surface and a thickness between the first and second surfaces, a plurality of nanoparticles interspersed within the host matrix, the plurality of nanoparticles being capable of generating at least one charge carrier upon interaction with the radiation, a first electrode disposed adjacent to the first surface of the host matrix, and a second electrode disposed adjacent to the second surface of the host matrix, wherein at least one outer coating encapsulating at least one of the plurality of nanoparticles, the coating changing the electrical behavior of the at least one nanoparticle.

50. The detector of claim 49, wherein the at least one outer coating comprises a plurality of coating layers.

51. The detector of claim 49, wherein the at least one outer coating partially encapsulates the at least one of the plurality of nanoparticles.

52. The detector of claim 49, wherein the at least one outer coating completely encapsulates the at least one of the plurality of nanoparticles.

53. The detector of claim 49, wherein the at least one outer coating comprises at least one material selected from a group comprising an inorganic material, ZnS, PbSe, an organic material, primary amines, alkylamine, and dodecylamine, an amorphous semiconductor, a crystalline semiconductor, an insulator, silicon, lead sulfide, lead telluride, mercuric iodide, thallium bromide, cadmium zinc telluride, and cadmium telluride.

54. A radiation detector, comprising:

a plurality of assemblies for converting radiation to electrical energy, disposed adjacent to one another in a stacked fashion, each of the assemblies comprising:

a host matrix defining a first surface and a second surface and a thickness between the first and second surfaces, a plurality of nanoparticles interspersed within the host matrix, the plurality of nanoparticles being capable of generating at least one charge carrier upon interaction with the radiation, a first electrode disposed adjacent to the first surface of the host matrix, and a second electrode disposed adjacent to the second surface of the host matrix, wherein the plurality of nanoparticles enable charge transport from particle to particle in at least one nanoparticle network within the host matrix.

55. The detector of claim 54, further comprising:

an overlayer at least partially encapsulating the at least one nanoparticle network.

56. The detector of claim 55, wherein the overlayer comprises at least one material selected from a group comprising an amorphous semiconductor, a crystalline semiconductor, an insulator, silicon, lead sulfide, lead telluride, lead selenide, mercuric iodide, thallium bromide, cadmium zinc telluride, and cadmium telluride.

57. A method for converting radiation to electrical energy in at least one assembly comprising a host matrix of inorganic semiconducting material defining a first surface and a second surface and a thickness between the first and second surfaces, a plurality of nanoparticles interspersed within the host matrix, the plurality of nanoparticles being capable of generating at least one charge carrier upon interaction with the radiation, a first electrode disposed adjacent to the first surface of the host matrix, and a second electrode disposed adjacent to the second surface of the host matrix, the method comprising:

establishing an electrical field between the first and second electrodes;

generating the at least one charge carrier as a result of interaction between the radiation and at least one of the plurality of nanoparticles;

capturing the charge carrier by at least one of the first and second electrodes; and generating an electrical signal as a result of capturing the charge carrier by the at least one of the first and second electrodes.

58. The method of claim 57, wherein the assembly further comprises a power source, operatively connected to the first and second electrodes, and a processor connected to at least one of the first and second electrodes, wherein the power source is configured to establish an electric field between the first and second electrodes, wherein a mobility-lifetime-field strength product for the at least one charge carrier is defined by the equation $MLFP=E \cdot t \cdot M$, wherein MFLP is a value for the mobililty-lifetime-field strength product, wherein E is a value for the electric field between the first and second electrodes, wherein t is a value for the lifetime of the at least one charge carrier, wherein M is a value for the mobility of the at least one charge carrier, and wherein a ratio of the mobility-lifetime-field strength product to the thickness between the first and second surfaces of the host matrix is greater or equal to 0.1 and the method further comprises:

providing the electrical signal to the processor; and processing the electrical signal to establish characteristics associated with the radiation, wherein the processing includes an accumulation mode where electrical signal is processed to characterize fluence of particles of the radiation.

59. The method of claim 57, wherein the assembly further comprises a power source, operatively connected to the first and second electrodes, and a processor connected to at least one of the first and second electrodes, wherein the power source is configured to establish an electric field between the first and second electrodes, wherein a mobility-lifetime-field strength product for the at least one charge carrier is defined by the equation MLFP=E·t·M, wherein MFLP is a value for the mobililty-lifetime-field strength product, wherein E is a value for the electric field between the first and second electrodes, wherein t is a value for the lifetime of the at least one charge carrier, wherein M is a value for the mobility of the at least one charge carrier, and wherein a ratio of the mobility-lifetime-field strength product to the thickness between the first and second surfaces of the host matrix is greater or equal to 0.1 and the method further comprises:

providing the electrical signal to the processor; and processing the electrical signal to establish characteristics associated with the radiation, wherein the processing includes a pulse mode and the electrical signal is processed to characterize individual particles of the radiation.

60. A method for operating a radiation detector, comprising:

providing a plurality of assemblies for converting radiation to electrical energy, disposed adjacent to one another in a stacked fashion, each of the assemblies comprising:

a host matrix defining a first surface and a second surface and a thickness between the first and second surfaces, a plurality of nanoparticles interspersed within the host matrix, the plurality of nanoparticles being capable of generating at least one charge carrier upon interaction with the radiation, a first electrode disposed adjacent to the first surface of the host matrix, and a second electrode disposed adjacent to the second surface of the host matrix; and establishing an electric field between the first and second electrodes and controlling that electric field based on a mobility-lifetime-field strength product for the at least one charge carrier, where the mobility-lifetime-field strength product is defined by the equation MLFP=E·t·M, wherein MFLP is a value for the mobility-lifetime-field strength product, wherein E is a value for the electric field between the first and second electrodes, wherein t is a value for the lifetime of the at least one charge carrier, and wherein M is a value for the mobility of the at least one charge carrier.

* * * * *

UNITED STATES PATENT AND TRADEMARK OFFICE

CERTIFICATE OF CORRECTION

PATENT NO. : 7,977,643 B2
APPLICATION NO. : 12/123412
DATED : July 12, 2011
INVENTOR(S) : Irving Weinberg It is certified that error appears in the above-identified patent and that said Letters Patent is hereby corrected as shown below:

In The Specification

In column 1, under heading GOVERNMENT LICENSE RIGHTS, starting at line 15-19 should read as follows:

--This invention was made with government support under grant number 5R44CA138013 awarded by National Institutes of Health. The U.S. Government has certain rights in the invention.--

Signed and Sealed this
Third Day of May, 2016

Michelle K. Lee
*Director of the United States Patent and Trademark Office*